INVENTORS
E.N. LENK
J.G. WEEKS
G.W. WIEST
BY R.P. Miller
ATTORNEY

INVENTORS
E.N. LENK
J.G. WEEKS
Q.W. WIEST
BY R.P. Miller
ATTORNEY

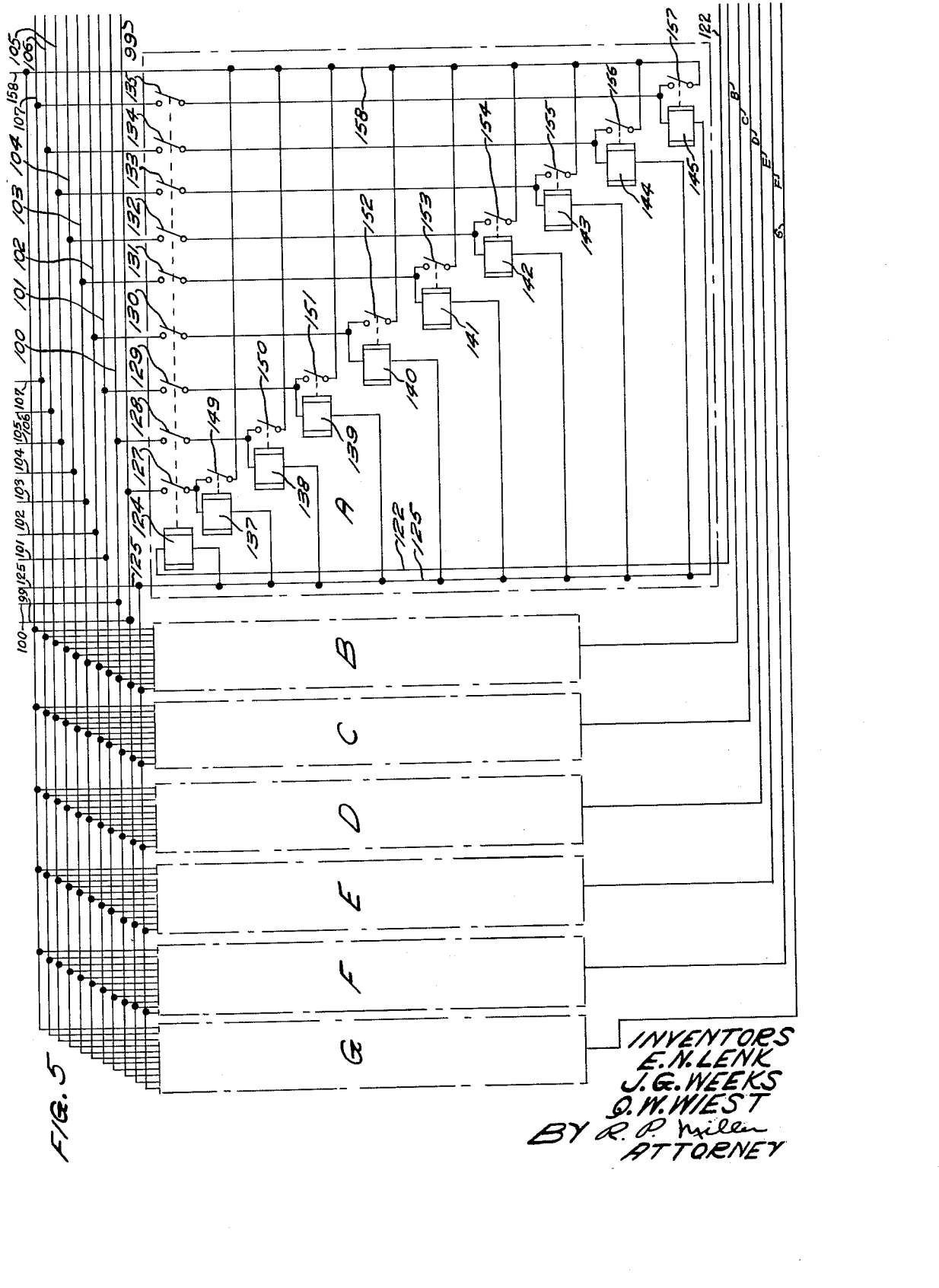

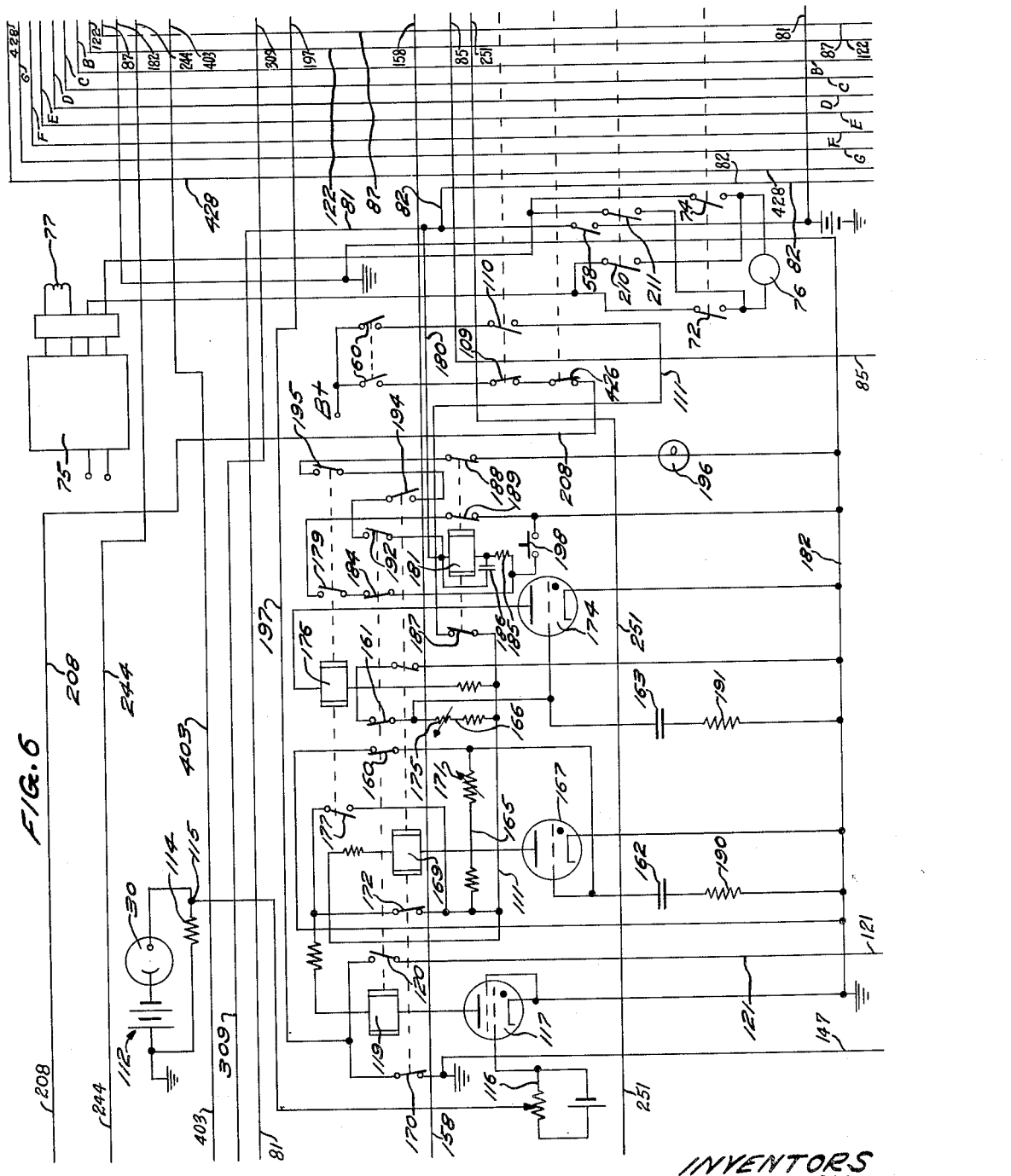

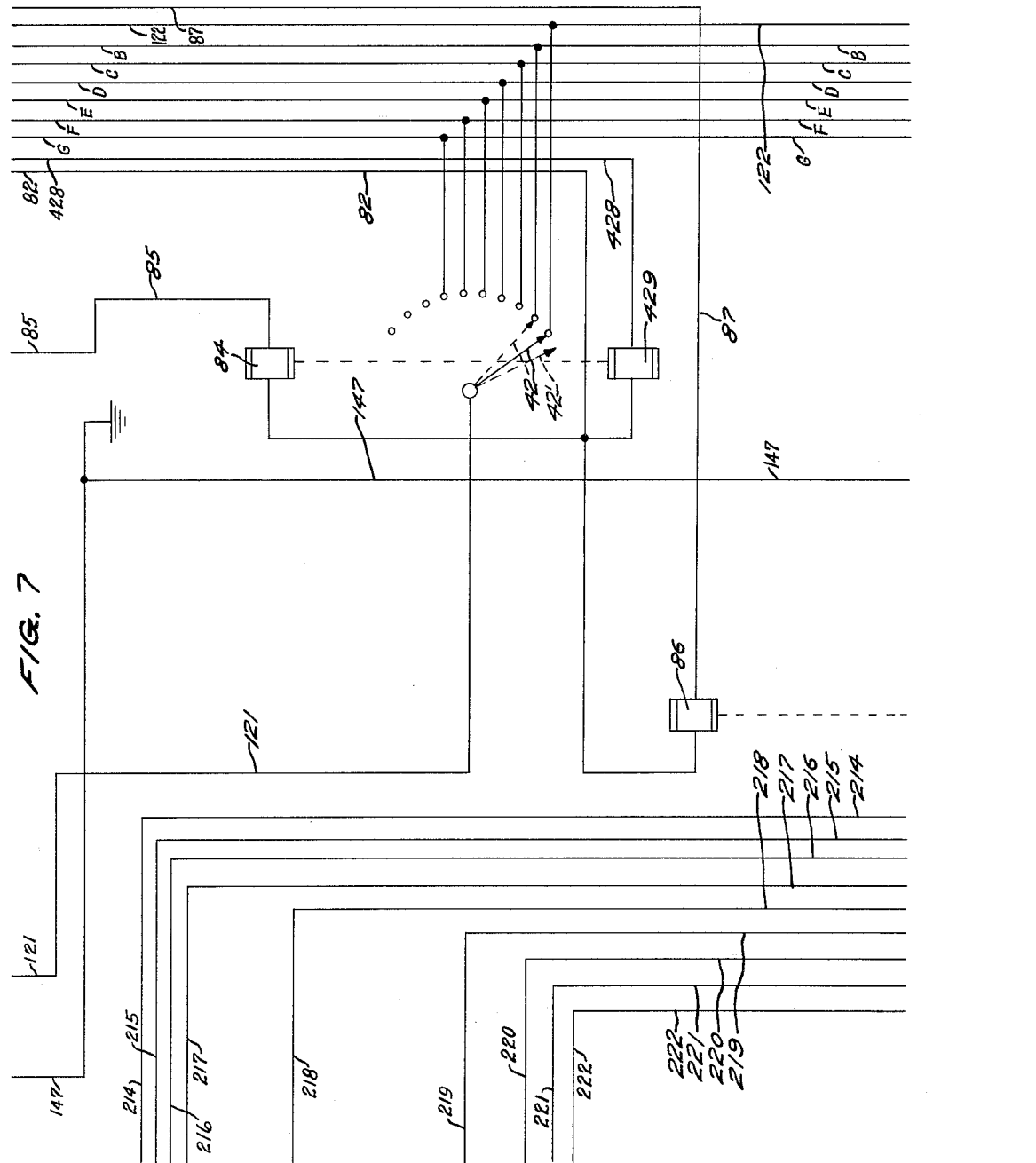

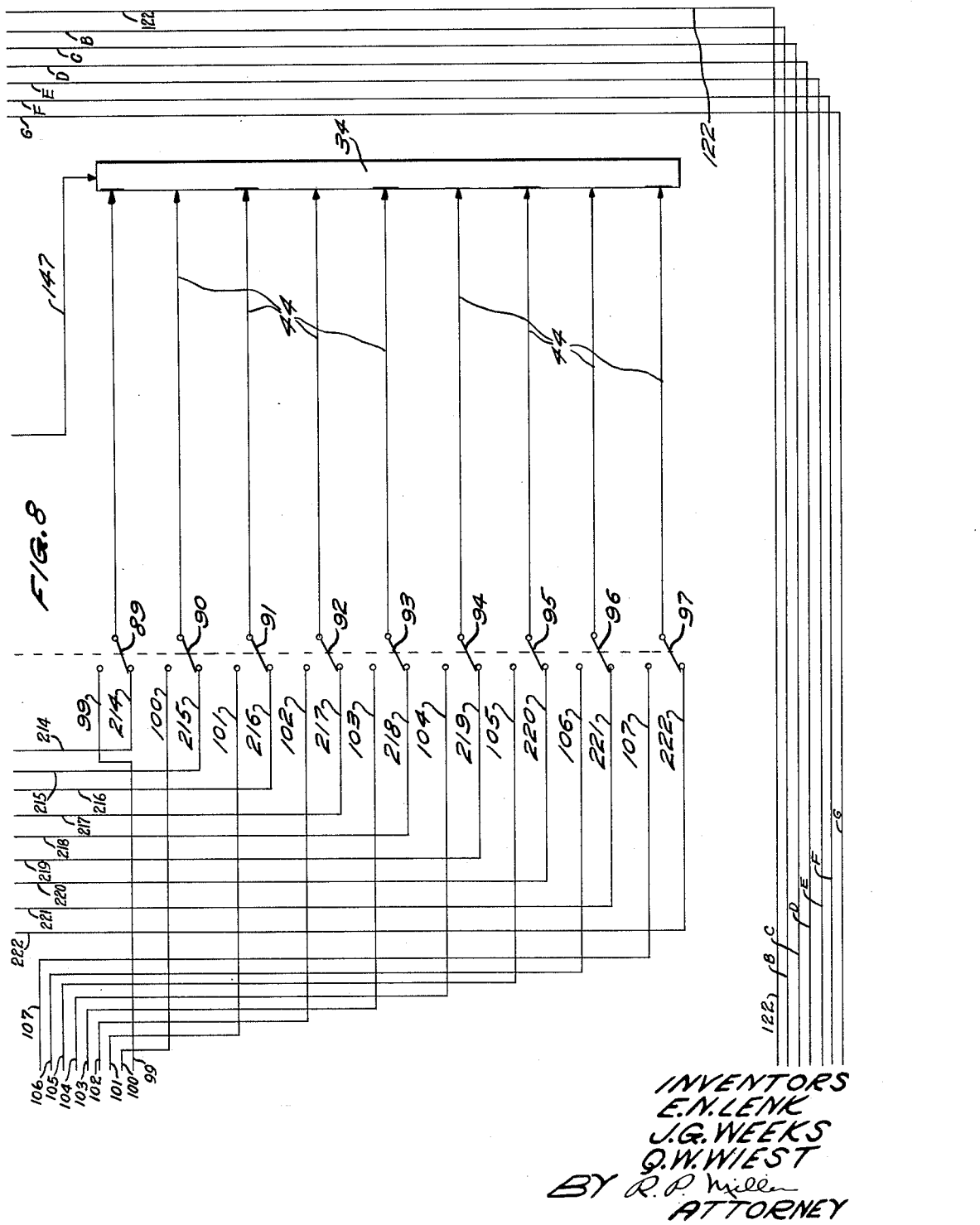

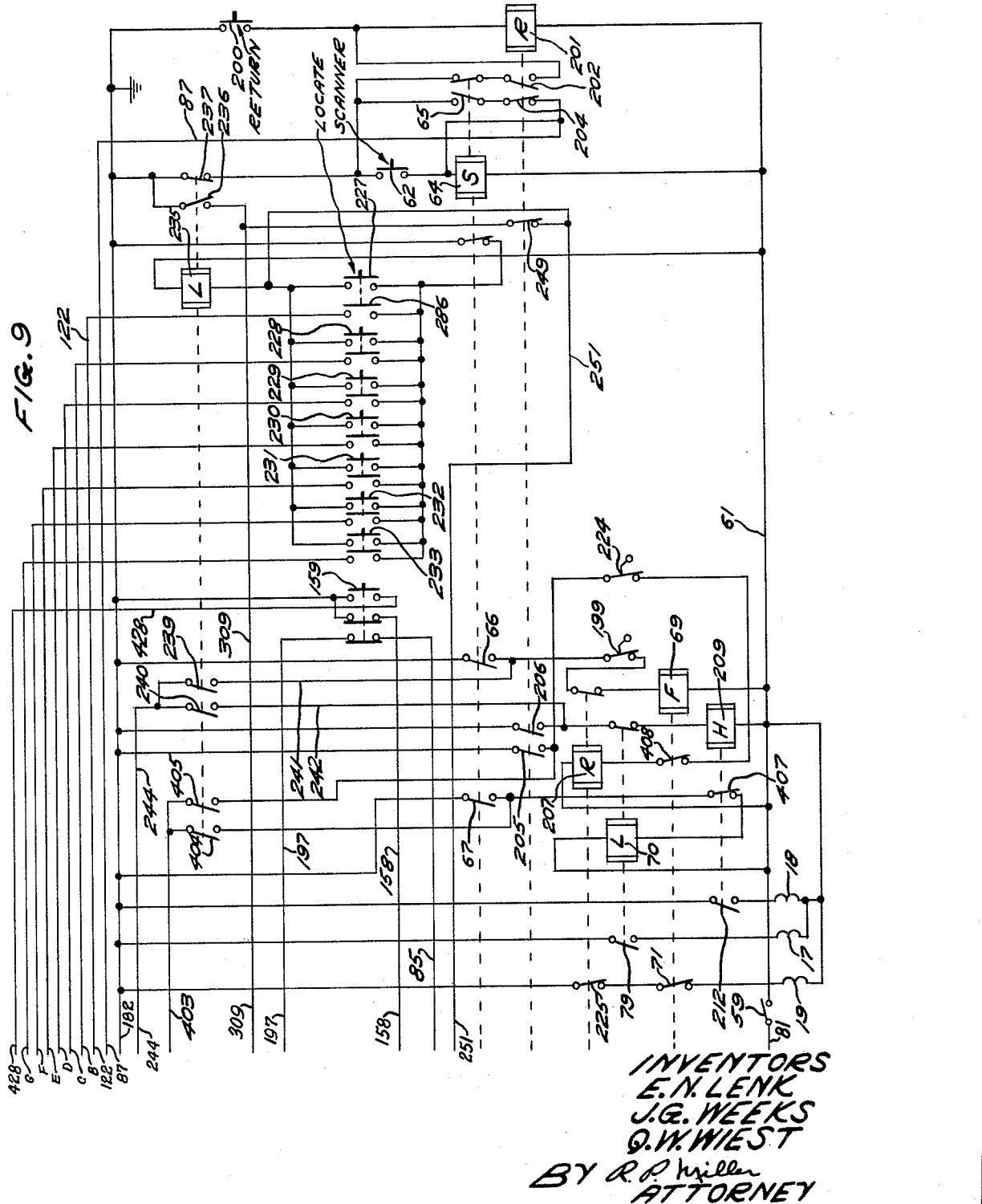

3,054,036
AUTOMATIC POSITIONING APPARATUS
Elmer N. Lenk, Westchester, John G. Weeks, Downers Grove, and Quentin W. Wiest, Western Springs, Ill., assignors to Western Electric Company, Incorporated, New York, N.Y., a corporation of New York
Filed Aug. 7, 1958, Ser. No. 753,819
2 Claims. (Cl. 318—162)

This invention relates to an automatic positioning apparatus and more particularly to an automatic machine for cross-connecting pairs of terminals in relay banks.

In the manufacture of telephone central office equipment, it is necessary to cross-connect many pairs of relay contacts in large banks of relays. Prior to this invention, these connections were made by hand operations. A skilled operator, supplied with precut wires and a wire wrapping gun, a soldering iron or other type of tool suitable for establishing electrical connections, would manually establish the desired connections. Each time a connection was to be made, the operator was required to consult a wiring diagram to ascertain which two terminals were to be connected. Aside from the fact that the repeated consultations of the wiring diagram consumed considerable time, manual wiring was undesirable due to the human errors which invariably appear. These errors are due largely to the extremely close spacing of large numbers of relay terminals; thus making it easy for an operator to make a mistake in the selection of the particular terminal to be wired. These problems could be obviated if a machine were devised to automatically perform the wiring operations.

It is therefore a primary object of this invention to provide an improved apparatus for automatically positioning a member relative to a series of element of unknown spacing.

It is another object of this invention to provide an improved apparatus for selectively positioning wiring devices relative to banks of relay terminals.

It is a further object of this invention to provide a scanning device which will detect the positions in space of columns of relay terminals and which will automatically indicate misalignment of terminals therein.

It is a still further object of this invention to provide a circuit which will store the information indicated by the scanning device.

It is yet another object of this invention to provide a coincidence circuit which will compare the stored information with coded impulses indicating spatial positions of the scanning device.

It is still another object of this invention to provide a circuit and apparatus which will automatically position wiring devices in predetermined positions in accordance with stored information.

With these and other objects in mind, the present invention relates to an apparatus for successively positioning a member at a series of positions which bear specific relationships to the positions of a plurality of elements having unknown spacing. A scanning device and the member are advanced adjacent the elements so that the positions of the elements are detected by the scanning device. The scanning device controls the transmission of data signals from a continuous signal producer, which produces data signals that are indicative of the positions of the member, to a recording device so that the data signals that are indicative of the positions of the elements are recorded. A controller is provided which responds to the coincidence of the recorded data signals and data signals produced by the signal producer when the member and the scanning device are subsequently advanced adjacent the element so that the member and the scanning device are successively stopped opposite succeeding ones of the elements.

Other objects, advantages and novel features of the invention will become apparent upon consideration of the following detailed description in conjunction with the accompanying drawings wherein:

FIGS. 3 to 9, inclusive, are portions of a schematic diagram of the control circuit for the wiring machine and form a complete circuit diagram when arranged in the manner illustrated in FIG. 10.

Figure 1:
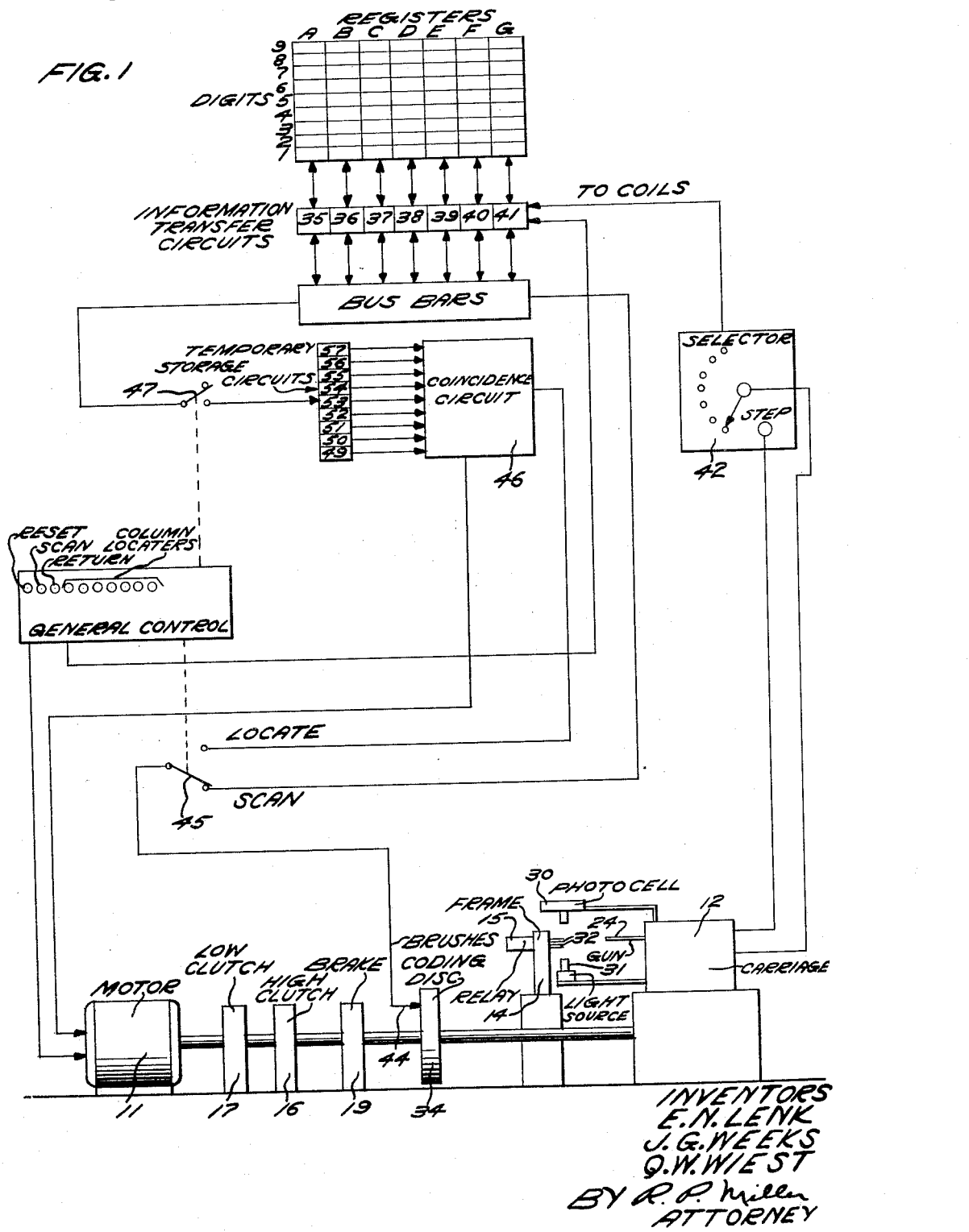
FIG. 1 is a diagrammatic representation of the wiring apparatus and the control circuit therefor.
Figure 2:
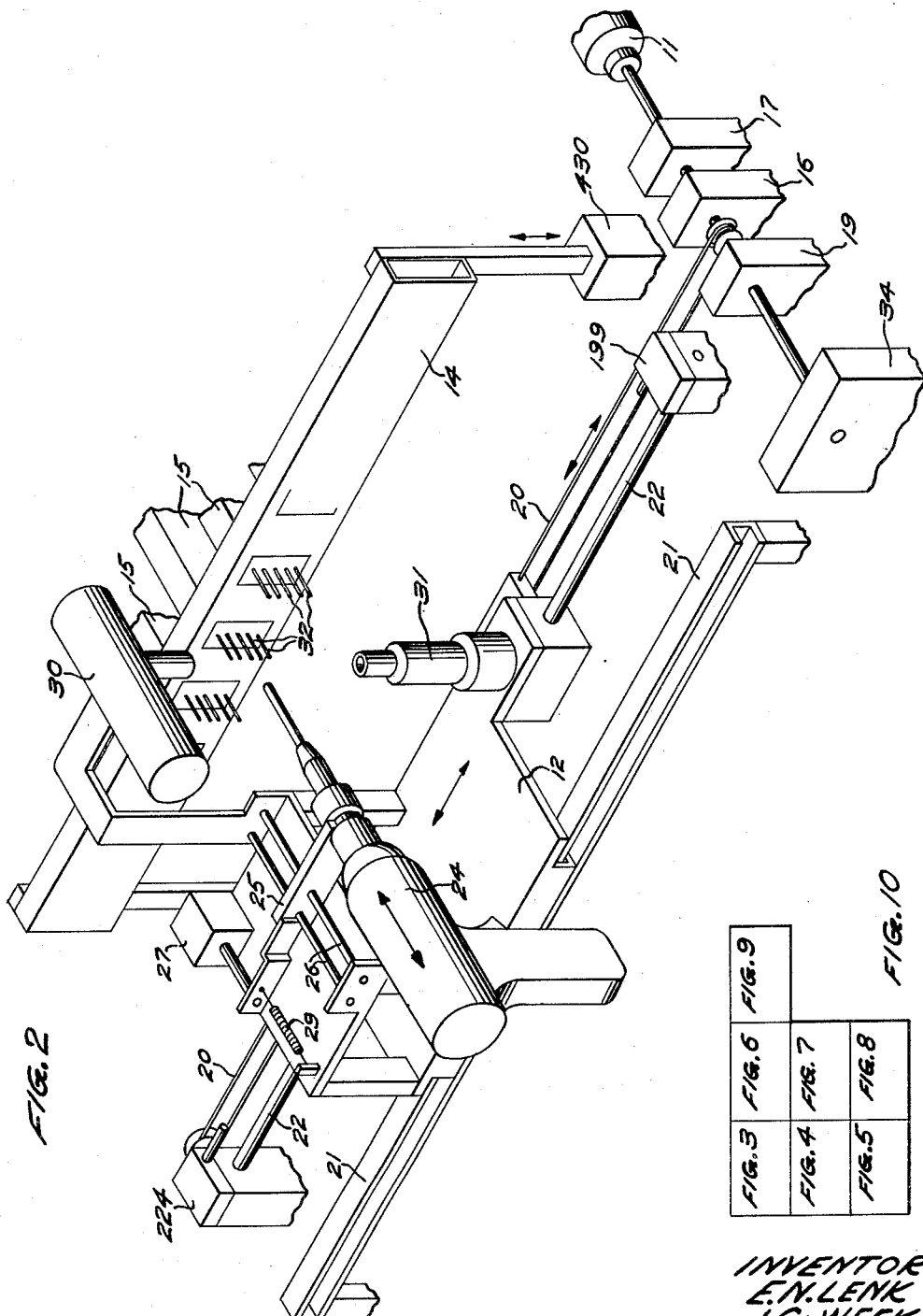
FIG. 2 is a perspective view of a wiring apparatus embodying the principal features of the invention.

Referring now to the drawings, and in particular to FIGS. 1 and 2, there can be seen a diagrammatic representation of the circuit and apparatus forming the present invention. A drive motor 11 is provided to traverse a carriage 12 parallel to a frame 14 that provides a mounting for a bank of relays 15. The drive train operated by the motor 11 includes high and low speed clutches 16 and 17 and a brake 19. A cable 20 (FIG. 2) connects the carriage 12 to the motor shaft and reciprocates the carriage along the guides 21 and 22 in accordance with the direction of rotation of the motor 11.

A wire wrapping gun 24 is reciprocably mounted on said carriage 12 by means of a mounting bracket 25 and guide rods 26. It is, of course, obvious that other types of wiring apparatus, such as wire welding guns, would be equally suitable in place of the wire wrapping gun shown. A solenoid 27 and spring 29 are provided to effect reciprocation of the gun 24 along the guide rods 26 and toward and away from the frame 14. The carriage 12 also mounts a photocell 30 and a light source 31 which may be energized by any suitable means. The photocell 30 and light source 31 are coaxial and are so positioned that vertical columns of relay terminals 32 will intercept a light beam traveling from the light source to the photocell as the carriage 12 is being traversed along the guides 21 and 22.

A general understanding of the mode of operation of the invention may be had by reference to the diagrammatic representation shown in FIG. 1. The drive motor 11 is energized to start the carriage 12 traversing from left to right as viewed in FIG. 2. In addition to traversing the carriage 12, the drive motor 11 also rotates a position indicating code disc 34. The disc 34 contains conducting and nonconducting segments arranged to form a binary code. Each binary number coded on the disc 34 represents a different position of the carriage 12 along its traverse path. As the light beam passing from the light source 31 to the photocell 30 is interrupted by each column of relay terminals 32, information transfer relay circuits designated generally by the reference numerals 35 to 41, inclusive, including memory relay 124 and the analogous relays in the remaining memory banks, are successively energized through an automatically stepping selector switch 42, i.e. relay 35 is energized when the first column of terminals is encountered, relay 36 is energized when the second column of terminals is encountered, etc. Each time one of these relays is energized, a permutation of signals indicative of the binary number on the coding disc 34 which is under the brushes 44 is transferred through switch 45 and recorded in the one of the memory registers A to G, inclusive, which corresponds to the particular transfer relay then energized.

After the successive locations of the various columns of relay terminals have been recorded in successive memory registers, the apparatus is now ready to position the wiring gun in accordance with the stored information. The switch 45 is first moved to the locate position. This causes the signals representing the various binary numbers on the code disc 34 to be successively applied to a coincidence circuit 46 as the carriage traverses the relay terminals 32 a second time. A switch 47 is then closed and the appropriate transfer relay (35 to 41) energized to transfer the information stored in one of the memory registers to one of a group of temporary storage relay circuits designated generally by the reference numerals 49 to 57, inclusive, including coincidence relays 266 to 274, which correspond in number to the number of relays which make up a single memory register. This information is then applied to the coincidence circuit. The coincidence circuit will permit the drive motor 11 to traverse the carriage 12 until the binary number stored in the storage relays 49 to 57, inclusive, corresponds to the number contacted by the brushes 44 on the coding disc 34. When coincidence occurs, the coincidence circuit stops the drive motor 11 and precisely positions the wiring gun relative to the relay terminals 32. The wiring gun 24 may then be actuated in a conventional manner to connect a wire to a terminal. When the machine is actuated to position the wiring gun at the next memorized position, the operation is identical except that a second memorized binary number is transferred to the relays 49 to 57, inclusive.

The foregoing is intended to be only a brief description to illustrate the general principles utilized in practicing the invention. For a more detailed description of the circuitry and apparatus utilized to accomplish the objects and purposes of the present invention; attention is now directed to FIGS. 3 to 9, inclusive.

To prepare the apparatus for operation, power switches 58 and 60 (FIG. 6) and 59 (FIG. 9) are closed.

Closure of switch 58 applies battery potential to the coincidence and memory circuits (FIGS. 3, 4 and 5) through line 81 (FIG. 6). When switch 58 is closed, battery potential is also applied to the selector circuit (FIG. 7) through line 82. This application of potential energizes stepping coil 84, which is grounded through line 85, to index the selector lever 42 to the position shown in solid lines in FIG. 7.

Figure 3:
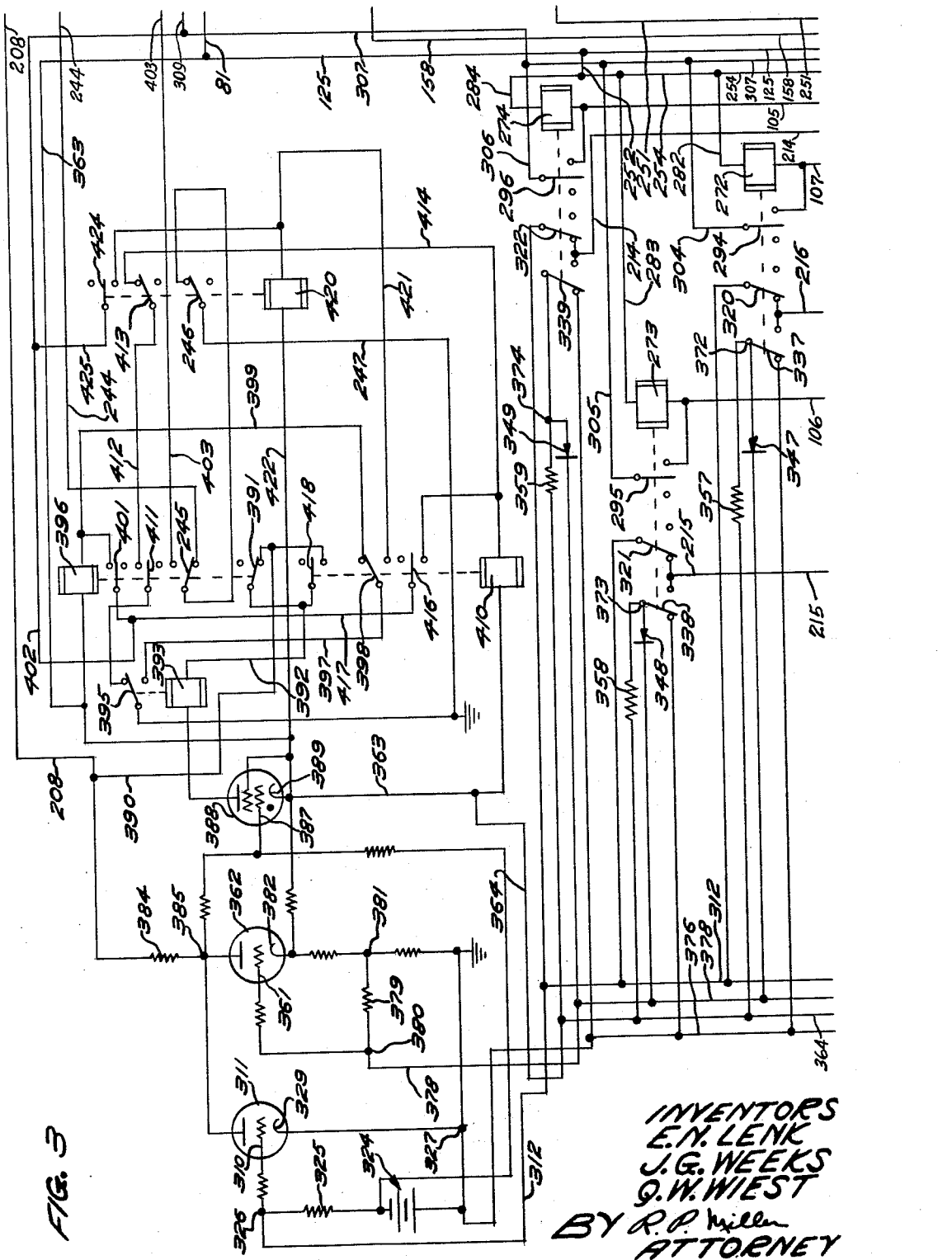
Figure 4:
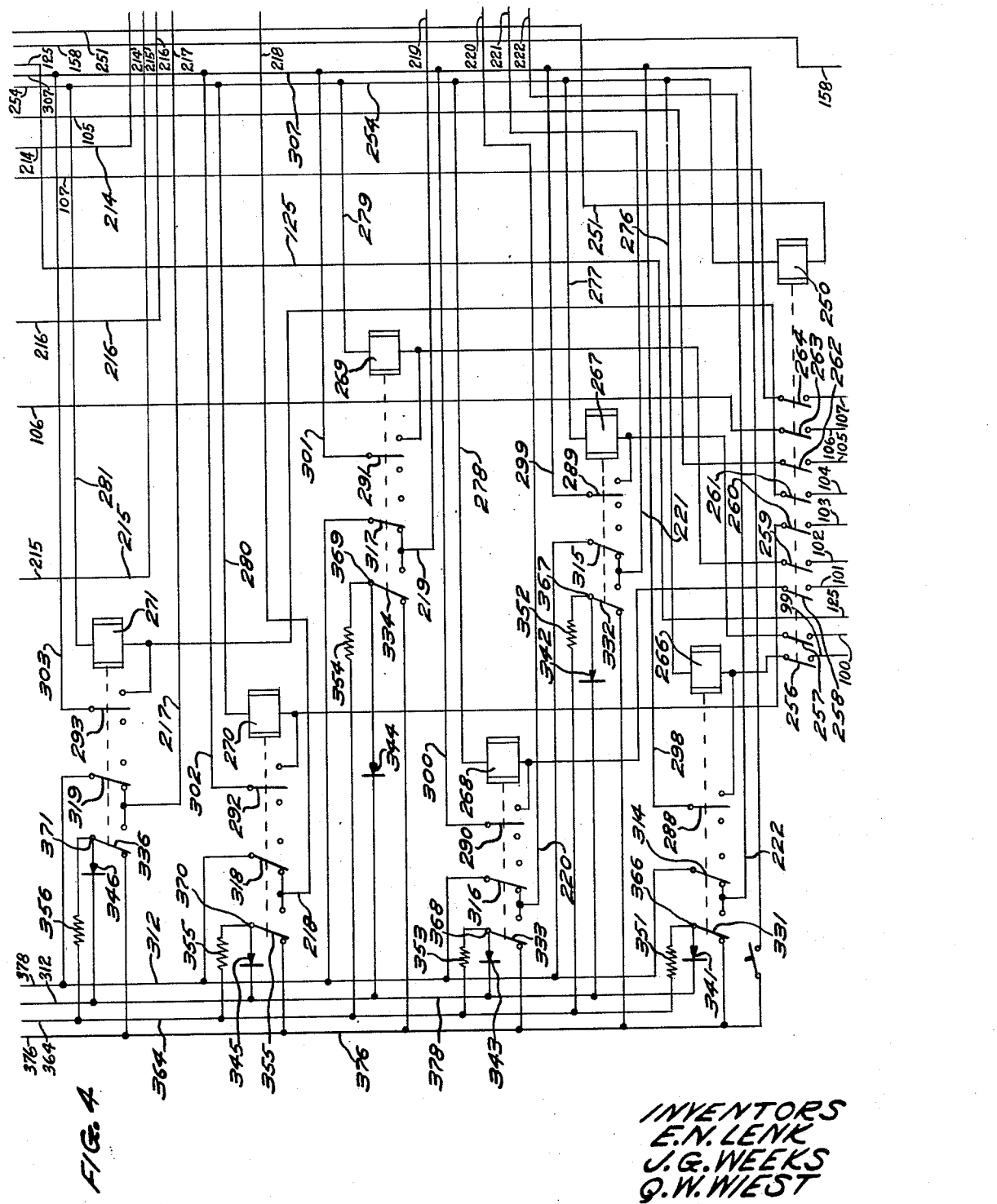

The switch 59 applies battery to the line 61, and the switch 60 closes the B+ circuit for the scanning circuit (FIG. 6) and the coincidence circuit (FIGS. 3 and 4). A switch 62 (FIG. 9) is next depressed to energize a scanner relay 64. This relay closes a pair of contacts 65 which lock in the relay 64.

Actuation of relay 64 also closes pairs of contacts 66 and 67 to energize a forward direction relay 69 and a low speed relay 70, respectively. Relay 69 opens contacts 71 to release the magnetic brake 19 and closes contacts 72 and 74 (FIG. 6) to apply electrical potential, from a conventional motor controller 75, to the armature 76 of the motor 11. The polarity of this potential is such that the carriage 12 will move in a forward direction or to the right as viewed in FIG. 2. The potential applied to a field 77 of the motor 11 is also regulated by the controller 75. Relay 70 closes contacts 79 to energize the low speed magnetic clutch 17 which causes the carriage 12 to be traversed at low speed. Relay 64 also opens contacts 109 and closes contacts 110 to remove the B+ voltage from the coincidence circuit and apply B+ to the scanner circuit through line 111.

Relay 86 (FIG. 7) is also energized since it is grounded through line 87 and the now closed contacts 65. Energization of relay 86 shifts contacts 89 to 97, inclusive, from the position illustrated in FIG. 8 to connect the brushes 44 to bus bars 99 to 107, inclusive.

The carriage 12 is now moving to the right, as viewed in FIG. 2, at low speed with the light source 31 energized and the photocell 30 (FIG. 6) conducting due to the light beam emanating from the light source. The photocell 30 is included in a series circuit with a battery 112 and a resistor 114. Since the positive terminal of the battery 112 is grounded, junction 115 will be at some negative potential whenever the photocell 30 is conducting. This negative potential is applied to a grid circuit 116 of a thyratron 117 to maintain the thyratron in a non-conductive state.

When the carriage has moved to a point where the light beam is interrupted by relay terminals 32, the photocell ceases conduction due to the absence of the light beam. When this occurs, the potential of point 115 rises to ground potential which in turn increases the potential applied to the grid circuit 116 and thus causes the thyratron 117 to become conductive.

The plate current from the conducting thyratron 117 energizes relay 119 which then closes contacts 120. Closure of contacts 120 applies ground through line 121, selector switch 42 (FIG. 7) and line 122 to relay 124 (FIG. 5) in the memory circuit. Relay 124 is thus energized since battery potential is being applied to the opposite side of its coil through line 81 (FIG. 6) and line 125 (FIGS. 3, 4 and 5).

Energization of relay 124 causes closure of contacts 127 to 135, inclusive. Closure of contacts 127 to 135, inclusive, connects one side of each relay 137 to 145, inclusive, to bus bars 99 to 107, inclusive. Since the opposite sides of relays 137 to 145, inclusive, are connected to line 125, which is at battery potential, any of these relays will be energized if its associated bus bar provides a path to ground. Since all of these bus bars are connected only to the coding disc 34 through contacts 89 to 97, inclusive, of relay 86, the path to ground must be completed through the coding disc.

As was previously indicated, the coding disc 34 is coded with binary numbers which represent a plurality of positions of the carriage 12 along the guides 20 and 21. The digits 1 of each binary number are represented on the coding disc by a conducting segment which is grounded through line 147. The digits 0 of each binary number are represented by non-conducting segments which consequently provide no path to ground. Assume that the binary number 101010101 represents the position of the carriage 12 when the first column of relay terminals 32 interrupt the light beam passing between the light source 31 and the photocell 30. This is the binary number illustrated as being under the brushes 44 in FIG. 8. The bus bars 99, 101, 103, 105, and 107 and their associated brushes 44 provide paths to ground through the conducting segments, representing the digit 1 on the code disc 34, and the ground lead 147. This causes relays 137, 139, 141, 143 and 145 to pull in and lock through their associated locking contacts 149, 151, 153, 155 and 157, lead 158 (FIGS. 5, 4, 3, 6 and 9), and a pair of normally closed contacts on reset switch 159 to ground. The relays 138, 140, 142 and 144 did not pull in due to the open portions of the coding disc 34 being under their associated brushes 44 and hence were not locked in by their associated locking contacts 150, 152, 154 and 156.

Upon being actuated, relay 119 (FIG. 6) also opens contacts 160 and 161. With these contacts open, a pair of capacitors 162 and 163 are no longer shorted out and hence begin charging due to the B+ voltage applied from line 111 through line 165 and 166 respectively. As the capacitor 162 is accumulating a charge, the grid bias applied to a cold cathode trigger tube 167 increases continually until the tube begins to conduct. Plate current from tube 167 energizes relay 169 to open contacts 170 which disconnect line 121 from ground and thus drops out relay 124 (FIG. 5). A variable resistor 171 is provided in line 165 to permit adjustment of the time delay caused by charging of capacitor 162. This adjustment permits the length of time for which relay 124 is energized to be varied to allow relays 137 to 145, inclusive, just enough time to operate.

Upon actuation, relay 169 also opens contacts 172 which are located in the B+ line connecting line 111 to the plate of the thyratron 117. This action resets the thyratron 117 and drops out relay 119.

As was pointed out above, relay 119 opened contacts 161 to start capacitor 163 charging simultaneously with capacitor 162. As capacitor 163 accumulates a charge, an increasing grid bias is applied to a cold cathode trigger tube 174 until this tube begins to conduct. The time which is required to start tube 174 conducting is adjustable by means of the variable resistor 175 and is adjusted to a somewhat longer time than that required to fire tube 167. The length of this time delay is selected to equal the time which is required for the carriage moving at low speed to traverse a distance equal to the horizontal width of a column of properly aligned relay terminals 32. When tube 174 begins conducting, its plate current energizes relay 176 which closes contacts 177 to re-connect the plate of the thyratron 117 to the B+ line 111. Relay 176 has also closed contacts 179 which close a circuit from battery potential in a line 180 through a relay 181 to ground in a line 182. When relay 176 reapplies B+ to the plate of the thyratron 117, the thyratron either will or will not fire again depending upon whether or not the light beam is still interrupted.

Assuming first that the column of relay terminals 32 was properly aligned and hence the light beam is no longer interrupted, then relay 119 will not be energized in the manner previously described since the grid bias on the thyratron 117 will be negative. Since relay 119 has not been re-actuated, contacts 184 on relay 119 remain closed which permits the continued application of battery potential to relay 181. A resistor 185 and capacitor 186 are provided in the circuit with relay 181 to provide a slight delay in the operation of this relay. This delay is to provide sufficient time for relay 119 to operate if it is going to do so due to the continued interruption of the light beam. It will not operate in this instance, however, since it was assumed that the light beam was no longer interrupted.

After the capacitor 186 has accumulated a sufficient charge, relay 181 operates to open contacts 187, and contacts 188 and 189 shortly thereafter. The opening of contacts 187 removes the B+ voltage from the plate circuits of all three tubes 117, 167 and 174. The opening of contacts 189 removes battery potential from relay 181 to deenergize this relay. The relay does not drop out immediately, however, since the capacitor 186 is discharging through the relay coil which provides a slight delay. This delay is built into the circuit to provide sufficient time for the capacitors 162 and 163 to discharge through resistors 190 and 191, respectively, so that the grids of tubes 167 and 174 are at a potential low enough to prevent refiring, when the reclosure of contacts 187 reapplies B+ to the plate circuits of these tubes. The low bias thus supplied to the grids in these tubes prevents them from refiring. The circuit has now been returned to its initial condition and is ready to respond to the next interruption of the light beam.

Assuming now that the column of relay terminals 32 was misaligned to such an extent that the light beam was still interrupted when relay 176 was energized by the plate current of tube 174, then relay 119 is again actuated due to the grid bias applied by the circuit 116. Actuation of relay 119 opens contacts 184 which removes the battery potential applied to relay 181, through the closure of contacts 179, and thus prevents the resetting of the tubes 117, 167 and 174 in the manner previously described.

Relay 119 has also closed contacts 192. When tubes 167 and 174 have timed out and relays 169 and 176 are actuated, then contacts 194 and 195, respectively, are closed by the aforementioned relays. When contacts 188, 192, 194 and 195 are all closed, battery potential is applied from the line 180 through a pilot light 196 to ground at 182. This pilot light indicates that the tubes 117, 167 and 174 are still conducting and thus are not in condition to energize the next bank of memory relays when the next column of relay terminals is encountered. The machine must then be stopped and this abnormal condition corrected by pushing reset switch 198 to operate relay 181 which resets the tubes 117, 167 and 174 as previously described.

Returning now to the assumption that the column of relay terminals 32 was properly aligned, the memory circuit (FIG. 5) is prepared to record the position of the next column of relay terminals 32 in the following manner. When the device was first started, battery potential was applied to stepping coil 84 through line 82, through the coil 84, line 85, reset switch 159, line 197 (FIG. 9) and contacts 170 (FIG. 6) to ground. When relay 169 was energized by the firing of tube 167, contacts 170 were opened to deenergize the coil 84. Relay 169 remains energized until it is reset by operation of the relay 181 which has previously been described. When relay 169 has been reset, contacts 170 reclose and ground is again applied to the stepping coil 84. This re-application of ground causes the coil 84 to step a movable arm of the selector switch 42 to its next position, as shown in dotted lines in FIG. 7. The selector switch is now in position to apply ground potential to a relay in memory register B which corresponds to the relay 124 in register A.

Thus, when the second column of relay terminals 32 is encountered by the scanning device, the binary number on the coding disc 34, which represents the position of this column of relay terminals, will be recorded in memory register B in exactly the same manner as that described above for the first column of relay terminals. The above sequence is followed until information representing the positions of all the columns of relay terminals has been recorded in the various memory registers. The memory registers have been disclosed as comprising a plurality of relays, but it is obvious that other types of information storage devices, such as magnetic tapes, may be desirable when the number of positions to be memorized is large.

Carriage 24 continues to be traversed to the right (FIG. 2) until the carriage triggers a limit switch 199 (FIGS. 2 and 9). When this switch opens, the forward relay 69 is deenergized which in turn recloses contact 71 to apply a brake 19 and re-opens contacts 72 and 74 to stop the motor 11 by removing the electrical potential from the armature 76.

The carriage is then returned to its starting or left-hand position by closing switch 200. This energizes return relay 201 which locks in through contacts 202. Relay 201 also opens contacts 204 to drop out the relay 64. When relay 64 drops out, contacts 110 and 109 open and close respectively to remove B+ from the scanning circuit (FIG. 6) by opening line 111, and applies it to the coincidence circuit (FIGS. 3 and 4) by closing line 208. Contacts 67 and 66 also re-open upon deenergization of relay 64 to drop out the low speed relay 70 and to prevent re-energization of the forward relay 69 when movement of the carriage permits the right-hand limit switch 199 to reclose.

Relay 201 also closes contacts 205 and 206 to energize a reverse direction relay 207 and a high speed relay 209 respectively. Energization of relay 207 closes contacts 210 and 211 to reverse the polarity of the potential applied to the armature 76 of the motor 11 and thus cause it to rotate in a direction opposite to that in which it previously rotated. Energization of relay 209 closes contacts 212 to energize the high speed clutch 18 and thus causes the motor 11 to traverse the carriage 12 at high speed. The carriage 12 then traverses to the left at high speed until it reaches its left-hand position at which time it trips the left-hand limit switch 224 (FIGS. 2 and 9) to deenergize relay 207. Deenergization of relay 207 recloses contacts 225 to apply the brake 19 and re-opens contacts 210 and 211 to remove the electrical potential applied to the armature 76 of the motor 11.

Additionally, the opening of contacts 204 opens the circuit from battery through line 82, relay 86 and line 87 to ground. This deenergizes relay 86 which causes the contacts 89 to 97, inclusive, to return to the position shown in FIG. 8. When these contacts have assumed this position, the code disc 34 through brushes 44 is then connected to the coincidence circuit through lines 214 to 222, inclusive.

At this time the apparatus has scanned and located the columns of relay terminals and has stored this information in the memory registers of FIG. 5. The apparatus is now prepared to be operated as a locating device for positioning the wiring gun 24 relative to preselected columns of terminals.

There is shown in FIG. 9 a plurality of manually operable switches 227 to 233, inclusive, which correspond to the memory registers A to G, respectively. These switches also correspond to 7 columns of relay terminals 32 whose positions have been recorded in the memory circuit in FIG. 5. Although only 7 switches and 7 memory registers have been disclosed, it is obvious that any number of switches and registers could be included in the circuit to accommodate a frame 14 mounting relays whose number exceeds 7.

Let us assume that it is desired to position the wiring gun 24 in alignment with the first column of relay terminals on the left of the frame 14, whose position was represented by the binary number 101010101 recorded in memory register A. To cause the machine to do this automatically, the switch 227 (FIG. 9) is manually closed. Closure of switch 227 (FIG. 9) energizes relay 235 which opens contacts 237 to drop out relay 201 by opening the circuit to ground. When relay 201 drops out contacts 249 close and relay 235 then locks in through contacts 236, allowing the switch 227 to be released. Actuation of relay 235 also closes contacts 239 and 240. Closure of these contacts applies ground to lines 241 and 242 to energize the forward relay 69 and high speed relay 209. The contacts 239 and 240 are grounded through lead 244 (FIGS. 9, 6 and 3), contacts 245, contacts 246, and line 247. The energization of relays 69 and 209 causes the carriage 12 to begin traversing in the forward direction (to the right in FIG. 2) at high speed in the manner previously described.

Closure of the contacts 249, together with the closure of contacts 236, also applies ground to the relay 250 (FIG. 4) through line 251 (FIGS. 9, 6, 3 and 4). Since battery is being applied to the relay 250 through line 125 (FIG. 3), lead 252 and line 254 (FIGS. 3 and 4), the relay 250 will be actuated.

Actuation of relay 250 effects the closure of contacts 256 to 264, inclusive, to connect a series of coincidence relays 266 to 274, inclusive, to the bus bars 99 to 107, inclusive. Battery is being applied to each of the relays 266 to 274, inclusive, from the battery line 254 through their associated leads 276 to 284, inclusive. Any of these relays will therefore be energized if the opposite side of the coil thereof is connected to ground.

When the switch 227 was closed, a second pair of contacts 286 (FIG. 9) thereon grounded the line 122 to again actuate the relay 124. Relay 124 closes contacts 127 to 135, inclusive, to again connect relays 137 to 145, inclusive, to the bus bars 99 to 107, inclusive. Since the bus bars 99 to 107 are not now connected to the coding disc 34, they provide no paths to ground and consequently, none of the relays 137 to 145, inclusive, changes its state, i.e. those relays which are already energized remain energized, and those which are deenergized remain deenergized.

The only paths to ground which would permit energization of relays 266 to 274 are through those of the locking contacts 149 to 157, which are held closed by their associated relays. Since the binary number which was assumed as the location of the first bank of relay terminals 32 was the number 101010101, the relays 137, 139, 141, 143 and 145 will be the only energized relays in memory bank A. The remaining relays are deenergized and their associated locking contacts are therefore open.

The coils of coincidence relays 266, 268, 270, 272 and 274 will therefore be grounded through the associated bus bars, locking contacts 149, 151, 153, 155 and 157 respectively, line 158, and reset switch 159 (FIG. 9). When relays 266, 268, 270, 272 and 274 are first energized, they close associated locking contacts 288, 290, 292, 294, and 296 and are thus locked in through leads 298, 300, 302, 304 and and 306; line 307 (FIGS. 3 and 4); line 309 (FIGS. 6 and 9); and contacts 236 to ground. Relays 267, 269, 271 and 273 are provided with locking contacts 289, 291, 293 and 295 and locking leads 299, 301, 303 and 305, but they are not utilized in this instance since the aforementioned relays remained unactuated.

When the switch 227 is released, the relay 124 is again deenergized and the relays 137 to 145 are again disconnected from the bus bars 99 to 107. The coincidence relays 266 to 274 are now energized in a pattern which duplicates that of the relays 137 to 145 in memory register A. The binary number 101010101 has thus been transferred to the coincidence circuit of FIGS. 3 and 4.

With relays 267, 269, 271 and 273 unactuated, a grid 310 (FIG. 3) of a vacuum tube 311 is connected to the coding disc 34 through a line 312; contacts 315, 317, 319 and 321; lines 221, 219, 217 and 215; contacts 96, 94, 92 and 90; and the corresponding brushes 44. The grid 310 is not connected to the code disc 34 through relays 266, 268, 270, 272 and 274 since these relays are pulled in and, consequently, contacts 314, 316, 318, 320 and 322 are all open. As long as any of the brushes 44, which are associated with the relays 267, 269, 271 and 273, is in contact with a conducting segment on the coding disc 34, a closed path is provided which will permit current from a battery 324 (FIG. 3) to flow through a resistor 325 and line 312 to the code disc and ground. When current is flowing through the resistor 325, the potential drop thereacross will cause the potential at junction 326 to be substantially equal to the potential of junction 327. As long as this condition prevails, the tube 311 will conduct. Whenever the brushes 44, which are associated with lines 215, 217, 219 and 221, simultaneously engage non-conducting segments on the coding disc 34, the current flow through the resistor 325 will cease, since all of the paths to ground have been opened. Cessation of current flow through the resistor 325 causes the potential at junction 326 to be reduced to the negative potential of the battery 324. This makes the potential on the grid 310 negative with respect to the cathode 329 and thus stops conduction of the tube 311.

Since the relays of the group of coincidence relays 266 to 274, which are unactuated, correspond to the digit "0," cessation of the conduction of tube 311 indicates the presence of a coded binary number beneath the brushes 44 whose digits "0" correspond in position to the digits "0" of the number recorded in memory bank A and on the relays 266 to 274. In the present instance, this would indicate a coded binary number whose second, fourth, sixth and eighth digits are all "0." In a nine digit binary code, however, there is a plurality of binary numbers whose second, fourth, sixth and eighth digits are all "0," although there will be only one number in which the remaining digits are all the digit "1." Consequently, the coincidence circuit of FIGS. 3 and 4 must be capable of selecting from the aforementioned plurality of numbers, the coded binary number which represents the position of the column of relay terminals being located.

For this purpose, the coincidence relays 266 to 274, inclusive, are provided with shorting contacts 331 to 339, respectively, associated diodes 341 to 349 inclusive, and associated load resistors 351 to 359 inclusive. With the relays 266, 268, 270, 272 and 274 actuated, current normally flows from the battery (FIG. 6) through the line 81, a line 363 (FIG. 3), a line 364, and through the load resistors 351 to 359 to the junctions 366 to 374 respectively. From here, the currents flow through the contacts 331, 333, 335, 337 and 339 and to ground through the lines 222, 220, 218, 216 and 214 and the code disc 34 whenever the brushes 44 associated therewith are engaging conducting segments of the code disc 34.

Since the relays 267, 269, 271 and 273 are unactuated, the currents at the junctions 367, 369, 371 and 373 will bypass the diodes 342, 344, 346 and 348 and flow directly to ground through a ground lead 376. Whenever any of the brushes 44 which are associated with the shorting contacts 331, 333, 335, 337 and 339 engages a non-conducting segment of the coding disc 34, the path to ground will be opened and the current will then flow through the associated diode, a line 378, and a resistor 379 (FIG. 3) to ground. As long as current is flowing through the resistor 379 to ground, the potential of junction 380 will be higher than that of junction 381. A grid 361 of a tube 362 will therefore be maintained at a higher potential than the cathode 382 of the tube 362. With the grid 361 and cathode 382 maintained in this potential relationship, the tube 362 will be maintained in a conductive state.

Whenever brushes 44, which are associated with lines 214, 216, 218, 220 and 222, simultaneously engage conducting segments on the coding disc 34, the current flow through the resistor 379 will cease, since all of the diodes 341, 343, 345, 347 and 349 will be shorted out. Cessation of current flow through the resistor 379 causes the potential at junction 380 to be reduced to the potential of junction 381. Since the grid 361 is at a lower potential than the cathode 382, conduction of the tube 362 will cease.

Because the relays of the group of coincidence relays 266 to 274, which are actuated, correspond to the digit "1," cessation of the conduction of tube 362 indicates the presence of a coded binary number beneath the brushes 44 whose digits "1" correspond in position to the digits "1" of the number recorded in memory bank A and on the relays 266 to 274. In the present instance, this would indicate a coded binary number whose first, third, fifth, seventh and ninth digits are all "1." In a nine digit binary code, however, there is a plurality of binary numbers whose first, third, fifth, seventh and ninth digits are all "1," although there will be only one number in which the remaining digits are all the digit "0." Consequently, provision must be made to enable the circuit to coordinate the indications of the vacuum tubes 311 and 362 in order to identify the preselected binary number 101010101.

As indicated previously, the tube 311 will cease conducting whenever non-conducting segments on the code disc 34 appear simultaneously beneath all of the brushes 44 which are associated with unactuated coincidence relays and the tube 362 will cease conducting whenever conducting segments on the code disc 34 simultaneously appear beneath all of the brushes 44 which are associated with actuated coincidence relays. When the tubes 311 and 362 cease conducting at the same time, the brushes 44 are then reading the preselected binary number which is recorded on the coincidence relays 266 to 274 and the carriage 12 will then be positioned directly opposite the column of relay terminals 32 which the apparatus is locating.

When tubes 311 and 362 stop conducting at the same time, current flow through a plate resistor 384 ceases and the potential of a junction 385 thus rises to the full B+ value. This applies the B+ potential to a grid 387 of a thyratron 388. The thyratron 388 will thus begin to fire since the cathode 389 thereof is only at battery potential.

When the thyratron fires, current will flow from the B+ line 208 through a line 390, contacts 391 and plate lead 392 to energize relay 393. Actuation of relay 393 moves contacts 395 from the position shown in FIG. 3 to apply ground to a relay 396 through a line 397, contacts 398 and lead 399. Since the other side of the coil of relay 396 is connected to battery line 363, relay 396 will pull in and lock through locking contacts 401, a line 402, line 309 and contacts 236 (FIG. 9) to ground.

Actuation of relay 396 shifts contacts 245 from the position shown in FIG. 3 to remove from forward relay 69 (FIG. 9) and high speed relay 209, the ground which had previously been applied thereto through lead 244, contacts 245 and contacts 246. Deenergization of these relays causes the removal of the forward polarity applied to the armature 76 of the motor 11 and also causes deenergization of the high speed clutch 18.

At the same time that lead 244 is disconnected from ground by shifting of the contacts 245, the contacts 245 connect a line 403 to ground; again through the contacts 246. With line 403 (FIGS. 3, 6 and 9) grounded, this ground will be applied to the low speed relay 70 and reverse relay 207 through the normally opened contacts 404 and 405 of actuated relay 235 and through the normally closed contacts 407 and 408 of relays 209 and 69, respectively. Since the opposite sides of the coils of relays 70 and 207 are connected to the battery line 61, these relays will pull in to energize the low speed clutch and to apply reverse polarity to the armature 76 of the motor 11.

The movement of the carriage 12 is reversed at this point because the carriage has over-shot the position being located during the time required for the sequential actuation of relays 393, 396, 70 and 207. Since the incremental movement of the carriage 12, which is represented by each binary number coded on the disc 34, is made quite small to insure a high degree of accuracy, the carriage will have over-shot the position being located by several increments. Consequently, it is necessary that the carriage 12 be slowly backed up until the position being located has again been reached.

While the movement of the carriage 12 was being reversed, relay 396 also opened contacts 391 to remove plate voltage from the thyratron 388 to drop out the thyratron and the relay 393. Relay 393, upon deenergization thereof, applies ground to a relay 410 through contacts 395, contacts 411 of actuated relay 396, lead 412, contacts 413 and lead 414. Since battery is being applied to relay 410 through line 363, relay 410 will pull in and lock through its contacts 416, lead 417, line 402, line 309 (FIGS. 6 and 9) and contacts 236 to ground.

Operation of relay 410 also re-applies plate voltage to the thyratron 388 by closing contacts 418 which connect B+ line 399 to plate lead 392. The thyratron 388 does not fire immediately upon re-application of the plate voltage, however, because the carriage 12 is no longer at the position being located and one or both of the vacuum tubes 311 and 362 will be conducting, thereby biasing the grid 387 of the thyratron at a potential beyond the cutoff point.

The carriage 12 is now backing slowly toward the desired location. When coincidence occurs again, the vacuum tubes 311 and 362 again cease conducting and fire the thyratron 388 to again actuate the relay 393 as previously described. Operation of relay 393 now applies ground to a relay 420 through contacts 395, line 397, contacts 398 of the energized relay 410 and a lead 421. Since battery is being applied to the relay 420 through line 363 and lead 422, the relay will pull in and lock through its contacts 424 which are grounded through lead 425, line 402, line 309 and contacts 236. Operation of relay 420 opens contacts 246 to remove ground from the low speed relay 70 and the reverse relay 207 by opening the connection between lines 403 and 247.

When the reverse relay 207 dropped out, the contacts 225 (FIG. 9) were permitted to close. Closure of contacts 225 will energize brake 19 to preclude further movement of the carriage 12 since the contacts 71 were already closed due to the deenergized state of the forward relay 69. The solenoid 27 (FIG. 2) is then energized to advance the wiring gun 24 toward the located column of relay terminals 32. When the wiring gun 24 has engaged the terminal to be wired, the gun is energized to connect a wire to the preselected terminal. The solenoid 27 is deenergized to permit solenoid spring 29 to retract the wiring gun 24 to the position shown in FIG. 2 when the wiring operation has been completed.

The return switch 200 (FIG. 9) is then depressed to energize the return relay 201 which locks in through its locking contacts 202 as previously described. Operation of relay 201 opens contacts 249 to drop out the locate relay 235. Deenergization of relay 235 opens contacts 236 which removes ground from line 309. This, in turn, removes ground from the line 402 (FIG. 3) to drop out relays 396, 410 and 420. Removal of ground from line 309 also removes ground from line 307 to drop out the relays 266 to 274 inclusive (FIGS. 3 and 4). The opening of contacts 249 by relay 201 also removes ground from the line 251 (FIGS. 9, 6, 3 and 4) to drop out the relay 250 and disconnect the coincidence circuit from the bus bars 99 to 107 by opening contacts 256 to 264. Operation of relay 201 also opens contacts 426 (FIG. 6) to remove B+ from the line 208 (FIGS. 6 and 3) and thus drop out vacuum tubes 311 and 362, thyratron 388 and the relay 393. The coincidence circuit is then completely reset and ready for the next locating operation.

Operation of relay 201 also closes contacts 205 and 206 (FIG. 9) to energize reverse relay 207 and the high speed relay 209 as has been previously described. The carriage 12 then traverses to the left until the left-hand limit switch 224 is engaged and opened thereby. The reverse relay 207 is deenergized by the opening of the switch 224 and permits the contacts 225 to again close in order to energize the brake 19 and stop the movement of the carriage 12. The apparatus is then ready for the next locating operation. The next cycle may then be initiated by pressing any of the manually operable switches 227 to 233 and the apparatus will again cycle in the aforementioned manner to position the wiring gun 24 relative to the preselected column of relay terminals 32.

To clear the memory registers when it is desired to wire a different type of relay frame 14, the manually operable reset switch 159 is depressed. This removes ground from the line 158 and thus drops out all the relays in the memory registers A to G. Actuation of the switch 159 also applies ground to a line 428 (FIGS. 9, 6 and 5) which is connected to a reset coil 429 on the selector switch 42. Since battery is being applied to the coil 429 through the line 82, the coil 429 will reset the movable arm of the selector switch to the position designated 42' in FIG. 7.

The present invention as disclosed is limited to the locating of the wiring gun 24 in various positions in a selected horizontal plane. A simple elevating mechanism, illustrated diagrammatically and designated by the reference numeral 430, is provided for mounting of the frame 14 and is used to raise and lower the frame 14 relative to the wiring gun 24 in order to select the horizontal plane containing the terminals to be wired. Should it be desirable to provide vertical positioning of the gun 24 in order to wire to a particular terminal in a first horizontal plane to another terminal in a second horizontal plane, then a second circuit such as the one disclosed may be used in conjunction with a mechanism for elevating the gun 24, similar to the afore-described traversing mechanism, to provide vertical positioning thereof. This second circuit would vertically position the gun 24 in the same manner as described and the combination of the two circuits would permit the gun 24 to be positioned axially of any individual terminal projecting from the relays mounted on the frame 14.

A second solution would be to provide a simple indexing mechanism to vertically step the wiring gun to the desired elevation. This apparatus would be predicated on the assumption that, when relays of the same type are mounted in a frame, the various layers of terminals would be in parallel horizontal planes of known spacing and consequently there would be no need for a vertical scanning system. The gun would be stepped vertically the desired number of spaces and positioned horizontally by the aforedescribed apparatus. The provision for horizontal scanning and positioning would still be utilized to permit the apparatus to accommodate frames 14 having various spacings between the relays and axially of the frame. Thus the apparatus could accommodate frames having any arrangement of relays and spaces where the variation was axially along the frame.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. Apparatus for successively positioning a member at a series of positions each bearing a specific relationship to the position of a corresponding one of a plurality of elements of unknown spacing, said apparatus comprising a scanning device movable with said member, means for advancing said member and said scanning device past said elements whereby said scanning device may detect the positions of said elements, means driven in correspondence with said member for continuously producing signals indicative of the positions of said member, means for recording said signals, means controlled by said scanning device for blocking the passage of said signals to said recording means except when said scanning device detects one of said elements, and control means responsive to coincidence of signals thus recorded and signals produced by said signal producing means upon subsequent movement of said member by said advancing means to interrupt movement of said member.

2. Apparatus for successively positioning a member at a series of positions each bearing a specific relationship to the position of a corresponding one of a plurality of elements of unknown spacing, said apparatus comprising a scanning device movable with said member, means for advancing said member and said scanning device past said elements whereby said scanning device may detect the positions of said elements, means driven in correspondence with said member for continuously producing signals indicative of the positions of said member, means for recording said signals, means controlled by said scanning device for distinguishing those ones of said signals produced by said signal producing means when said scanning device detects one of said elements, and control means responsive to coincidence of the recorded signals thus distinguished and signals produced by said signal producing means upon subsequent movement of said member by said advancing means to interrupt movement of said member.

References Cited in the file of this patent

UNITED STATES PATENTS

| | | |
|---|---|---|
| 2,537,427 | Seid et al. | Jan. 9, 1951 |
| 2,537,770 | Livingston et al. | Jan. 9, 1951 |
| 2,696,565 | Shockley | Dec. 7, 1954 |
| 2,775,727 | Kernahan et al. | Dec. 25, 1956 |
| 2,853,664 | Towns et al. | Sept. 23, 1958 |
| 2,888,666 | Epstein | May 26, 1959 |
| 2,901,730 | Goddard | Aug. 25, 1959 |